United States Patent
Smith et al.

[15] 3,673,062

[45] June 27, 1972

[54] ELECTROWINNING OF METAL

[72] Inventors: George Armstrong Smith, Kitwe, Zambia; Donald Simon MacLeod, Cobalt, Ontario, Canada

[73] Assignee: New Nchanga Consolidated Copper Mines Limited

[22] Filed: Feb. 8, 1971

[21] Appl. No.: 113,736

[30] Foreign Application Priority Data

Feb. 6, 1970    Zambia..................................15/70

[52] U.S. Cl..............................................704/112, 204/119
[51] Int. Cl......................C22d 1/14, C37d 1/22, C22d 1/24
[58] Field of Search..........................................204/112, 119

[56]            References Cited

FOREIGN PATENTS OR APPLICATIONS 992,584   5/1965   Great Britain..........................204/112
933,399   8/1963   Great Britain..........................204/112
121,366   5/1946   Great Britain..........................204/112

Primary Examiner—John H. Mack
Assistant Examiner—R. L. Andrews
Attorney—Young & Thompson

[57]            ABSTRACT

The invention deals with a process in which an electrolyte for the cathodic deposition of cobalt is made up by dissolving a precipitated cobalt hydroxide resulting from precipitation by lime. The advance electrolyte is passed through a bed of activated carbon so that sulphide, which has been traced to impurities in the lime, and other contaminants are removed.

5 Claims, No Drawings

ELECTROWINNING OF METAL

This invention relates to the electrowinning of metals such as cobalt.

Most of the virgin cobalt metal produced today is obtained by electrowinning from a solution of its salts, commonly in sulphate form. In Zambia cobalt concentrates are roasted to convert sulphides to sulphates which are then leached in dilute sulphuric acid. After extracting the greater part of the dissolved copper by electrolysis, the leach liquor passes through a purification process in which iron, remaining traces of copper and certain other impurities, if present, are removed by precise control of solution pH. Finally, cobalt in the purified liquor is precipitated as hydroxide at a pH of 8.5. The cobalt hydroxide is dissolved in "spent" electrolyte from the cobalt tank-house with the addition of some fresh sulphuric acid to give an "advance" electrolyte of pH 6.5 containing 30–40 grams per liter of cobalt. The advance electrolyte is fed at a temperature of 65° C to the tankhouse where cobalt is recovered as metal by electro-deposition on stainless steel cathode blanks. Normally, cathode production operates on a four-day cycle.

The adjustment of pH for precipitating the various elements is made by controlled additions of milk-of-lime.

When cobalt is deposited cathodically from a sulphate-base electrolyte, it has commonly been accepted by producers that sulphur in the metal is present as occluded sulphate. This assumption was supported by the fact that a dense deposit of cobalt with a lower sulphur content is obtained on a stainless steel blank, as against a more porous deposit with markedly more sulphur which is obtained on a mild steel blank.

The present invention is predicated by the surprising discovery that sulphur occurs in cobalt cathode metal in two separate forms:

1. As occluded sulphate in small ($\pm$ 6 ppm) relatively consistent amounts.
2. As occluded hydrogen sulphide gas, which accounts for essentially all the variations in total sulphur content.

The source of occluded hydrogen sulphide has been traced to the presence of sulphide in the lime used to precipitate the various elements in the process described above. A sulphide or sulphides forms in the electrolyte in an apparently pseudo-colloidal state that cannot be filtered out. These sulphides react with nascent hydrogen at the cathode to form hydrogen sulphide gas, part of which is occluded in the depositing metal.

The invention provides a method of removing at least some of the sulphide thus formed in the electrolyte so that the sulphur content in the cathode is reduced.

According to the invention advance electrolyte, after suitable filtration is contacted with activated carbon to remove sulphide in the electrolyte.

Conveniently the electrolyte is passed through a bed of granular activated carbon, the bed depth being chosen to give the desired contact time.

The nature of the activated carbon is important. Depending on its source the carbon may be used as supplied by manufacturers, but most varieties have to be activated by treatment with sulphuric acid. Spent carbon is also regenerated by means of sulfuric acid. A 10 percent by volume solution of sulphuric acid is suitable for these purposes.

The invention has been tried on a practical scale in a cobalt plant tankhouse using an activated carbon sold under the trade name CAL.

A column 180 cm long, 20 cm dia. was fabricated from stainless steel pipe (type 316) for large-scale tests in the tankhouse. The column was designed so that it could be operated on down or upflow, with pressure and temperature gauges at appropriate points, flowmeter, pressure release valve at the top and facilities for reactivation with acid. The carbon bed, 20 kg in weight, rested on a filter cloth supported by a perforated plate above a conical outlet. Normal tankhouse electrolyte was fed to the top inlet of the column by a mono-pump capable of delivering up to 20 l/min. As all advance electrolyte in the tankhouse passes through a precoated bag (Scheibler) filters, further filtration prior to carbon column treatment was unnecessary.

It was found that a flow rate of 9 l/min could be maintained at a pressure of 0.35 kg/cm$^2$ throughout the column except near the top, where a gradual increase to 1.4 kg/cm$^2$ over a period of 6–12 hours frequently occurred. This was due to entrapped gas. When the gas was released to atmosphere through a vent, either manually or automatically, normal pressure and flow were restored.

The volume of electrolyte treated was sufficient to sustain a complete tankhouse cell of 9 blanks (18 cathode sides) so that, in addition to a study of flow rates and pressure, the effect on the quality of full-sized cathodes produced under normal plant conditions could be observed.

The relevant analyses of 4-day cathodes produced during several such test runs are given in the table. The total sulphur content of metal from treated electrolyte was consistently 10 to 12 ppm, while that for the rest of the tankhouse during the same period varied between 21 and 40 ppm. depending on the sulphide concentration of advance electrolyte. Removal of surface sulphate from test cell cathodes by a nitric acid dip reduced total sulphur to 5 ppm (test run 4). The action of heat and vacuum during the degassing of cathodes prior to shipment likewise serves to remove surface contamination. Hence, finished metal of less than 10 ppm sulphur can be expected from this process. The analysis of the cathodes also confirmed that significant decreases in oxygen, hydrogen and carbon contents result from carbon treatment of electrolyte. The average reductions of these elements in the full-sized cathodes were 40 per cent, 54 per cent and 49 per cent respectively. The reduction in oxygen and carbon is attributed to absorption by active carbon of organic contaminants in the electrolyte.

Apart from the greater purity of cathodes deposited from treated electrolyte, a noticeable improvement to their physical appearance was observed, There were also strong indications that the tendency for cathodes to "peel" was much reduced or even virtually eliminated. Peeling of cathodes away from the surface of the parent steel blank during electrodeposition is a persistent cause of lost production. It stems from high and uneven stresses within a cathode which are, at least in part, linked with the precence of occluded gas.

TABLE

Comparison of analyses of cathodes produced in Cobalt Plant Tankhouse from normal and carbon-treated electrolyte, results as ppm.

| Test No. | Normal Electrolyte | | | | Treated Electrolyte | | | |
|---|---|---|---|---|---|---|---|---|
| | S | H$_2$ | O$_2$ | c | S | H$_2$ | O$_2$ | c |
| 1 | 40 | 7.737 | 41 | | 12 | 3.5 | 18 | 29 |
| 2 | 21 | 16.667 | 41 | | 11 | 9.0 | 32 | 29 |
| 3 | 27 | 11.663 | 60 | | 12 | 8.3 | 33 | 38 |
| 4 | *21 | 13.446 | 70 | | *5 | 8.8 | 10 | 22 |

*Surface sulphate removed by HNO$_3$

It has been shown that there is a distinct relationship between peeled cathodes and their average hydrogen content. As their hydrogen content falls, the tendency of cathodes to peel is greatly reduced. The substantial decrease brought about by the invention will thus benefit production considerably by reducing peeler scrap.

The carbon has been successfully regenerated using chemically pure sulphuric acid and commercial sulphuric acid, both in concentrations of 10 percent by volume. Furthermore crude sulphuric acid after aeration or oxidation to remove or reduce uncoverted sulphur dioxide has also proved successful. About 0.2 percent by weight/volume of potassium dichromate proved highly suitable for this purpose.

The intervals between regeneration of carbon columns will depend on the size of the columns and the sulphide content of the electrolyte. Conveniently the columns may be designed to run continuously for one to three weeks between regenerations. In small scale tests, carbon that has been reactivated as much as 12 times has still proved suitable for the process of the invention. It will be noted that the invention has not only succeeded in reducing the sulphur content of cathodic cobalt metal, but has also led to reductions in other impurities such as internal oxygen, hydrogen and carbon. Especially important is the reduction in cathode peeling. Increase in production of good metal due to this effect alone may more than recoup the costs of the process of the present invention.

Obviously the invention is applicable to the winning of other metals such as zinc, iron and nickel which are recovered by electrolysis from electrolytes that dissolve precipitates made by the use of lime.

WE CLAIM:

1. A process for the electrowinning of metals in which a relatively pure compound of a metal is obtained by precipitation with lime, the pure compound is dissolved in the spent electrolyte from the electrowinning process to provide advance electrolyte and the advance electrolyte after filtration is passed through electrolytic cells in which the metal is deposited on cathodes characterized by the step of contacting the advance electrolyte with activated carbon.

2. The process claimed in claim 1 in which the advance electrolyte is passed through a bed of granular activated carbon.

3. The process claimed in claim 1 in which the carbon has been activated by treatment with sulphuric acid.

4. The process claimed in claim 1 in which spent activated carbon is reactivated by means of sulphuric acid.

5. A process for the electrowinning of cobalt in which a hydroxide of cobalt is obtained by precipitation with lime, the hydroxide is dissolved in the spend electrolyte from the electrowinning process to provide advance electrolyte is after filtration passed through electrolytic cells in which cobalt is deposited on cathodes, characterized by the step of contacting the advance electrolyte with activated carbon.

* * * * *